United States Patent
Miyake et al.

[15] 3,678,160
[45] July 18, 1972

[54] HYDROXYETHANE SULFONIC ACID DERIVATIVE OF ENDURACIDIN REDUCTION PRODUCT

[72] Inventors: Akira Miyake, Nishinomiya; Stoshi Horii, Takatsuki; Jisaburo Ueyanagi, Nishinomiya, all of Japan

[73] Assignee: Takeda Chemical Industries, Ltd., Osaka, Japan

[22] Filed: Jan. 14, 1969

[21] Appl. No.: 791,127

[30] Foreign Application Priority Data

Jan. 22, 1968 Japan..................................43/3639

[52] U.S. Cl...............................................424/117, 424/118
[51] Int. Cl. ...........................................................A61k 21/00
[58] Field of Search..................................................424/117

[56] References Cited

OTHER PUBLICATIONS

Derwent Farmdoc No. 37,713, NE. 68, 16640, pp. 133–141, published May 27, 1969

*Primary Examiner*—Jerome D. Goldberg
*Attorney*—Wenderoth, Lind & Ponack

[57] ABSTRACT

Enduracidin derivatives of the formula

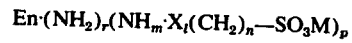

wherein En is Enduracidin residue, $r$ is 0, 1 or 2, $p$ is 1, 2 or 3 and $r$ plus $p$ is 3, X is a member selected from the group consisting of hydroxyl, amino radical and a radical represented by the formula: $-SO_3M$, wherein M is hydrogen or alkali metal, $n$ is 1, 2 or 3, $m$ is 1 or 2, and $l$ is 0 or 1, and when $n$ is 1, $m$ represents 1, $l$ represents 0 and X represents hydroxyl radical, and when $n$ is 2 or 3, $m$ represents 2 and $l$ represents 1, have improved stability and therapeutic activity of Enduracidin itself.

1 Claim, No Drawings

HYDROXYETHANE SULFONIC ACID DERIVATIVE OF ENDURACIDIN REDUCTION PRODUCT

The present invention relates to new Enduracidin derivatives which are useful as antibiotics. More particularly, the present invention relates to Enduracidin reduction product or its acid salt and processes for preparation thereof.

Enduracidin is the general name of an antibiotic which is produced by *Streptomyces fungicidicus* No. B-5477 (ATCC-21013). The production and antibacterial properties are reported by E. Higashide et al. (The Journal of Antibiotics An International Journal Vol. XXI, No. 2, pp. 126–137), the isolation and characterization of Enduracidin are reported by M. Asai et al. (Ibid. Vol. XXI, No. 2, pp. 138–146) and the antimicrobial activity of Enduracidin is reported by K. Tsuchiya et al. (Ibid. Vol. XXI, No. 2, pp. 147–153). Enduracidin itself and the process for the preparation thereof are also patented as French Pat. No. 1514139, Belgian Pat. No. 688207, Spanish Pat. No. 332148, East German Pat. No. 58789, Argentine Pat. No. 159523 and South African Pat. No. 66/6073, etc.

Enduracidin is an antibiotic of the peptide type which is composed of such moieties as aspartic acid, threonine, allothreonine, serine, glycine, alanine, ornithine, citruline, α-amino-4-hydroxyphenylacetic acid, α-amino-3,5-dichloro-4-hydroxyphenylacetic acid, fatty acid and two basic amino acids and others. This antibiotic shows the maximum absorptions in the ultra-violet spectrum measured in 90 percent methanol at about 230 and 263 m$\mu$. It is a colorless powder which decomposes at 225° to 240° C and has very strong antimicrobial activity against gram-positive bacteria and phytophathogenic bacteria, and shows no cross-resistance with such known antibiotics as tetracycline, chloramphenicol, erythromycin, cephaloridine, oleandmycin, kanamycin, streptomycin, penicillin-G, aminobenzyl-penicillin and neomycin.

It has been discovered that, in comparison with Enduracidin as such, the reduction product thereof has a considerably reduced toxicity, i.e. $LD_{50}$ of Enduracidin reduction product is 350 mg/kg. (intravenous injection in mice), while $LD_{50}$ of Enduracidin itself is 33.5–60 mg/kg in the same condition. Further, the reduction product of Enduracidin has an improved stability and a therapeutic activity which is equally or more effective than Enduracidin itself. Enduracidin reduction products and salts thereof are disclosed in copending application Ser. No. 778,300, filed Nov. 22, 1968.

It has now been found that organic sulfonic acid derivatives of the reduction products of Enduracidin are less toxic (e.g. $LD_{50}$ of the hydroxyethansulfonate is larger than 500 mg/kg. intravenous injection in mice, $LD_{50}$ of the hydroxymethanesulfonate is 500–800 mg/kg in the same condition), and further these derivatives give a steep rise in blood level.

The principal object of the present invention is to provide organic sulfonic acid derivatives of the Enduracidin reduction products which have lower toxicity to mammals and keep higher concentrations of the antibiotics in the blood when compared with the hitherto-known Enduracidin.

Another object of this invention is to provide Enduracidin derivatives which have strong antimicrobial activity against gram-positive bacteria and also even against such bacteria that have acquired resistance to hitherto-known antibiotics such as streptomycin and neomycin.

A further object is to provide processes for preparing the novel and useful products.

Still another object of the present invention is to provide new pharmaceutical compositions containing one or more of the Enduracidin derivatives.

Other objects of the present invention and advantageous features thereof will become apparent as the description proceeds.

Enduracidin reduction product which is used in preparing the derivatives of the present invention is obtained by catalytic reduction of Enduracidin or a salt thereof in the presence of the metal catalyst at atmospheric or elevated pressure involving the use of, e.g. platinum, palladium. The Enduracidin reduction product and the process of preparation do not form a part of the present invention and the following disclosure relative thereto is presented for the sake of completeness of disclosure since such product is utilized as starting material for the derivatives of this invention.

Generally speaking, the reaction is carried out in a solvent which is non-reactive with Enduracidin or its salt and in which Enduracidin or its salt can be dissolved or suspended. Such a solvent is exemplified by water, methanol, acetic acid, and dioxane or a mixture thereof. As the starting material for the reduction process, Enduracidin or a salt thereof may be used. As the salt of Enduracidin, there may be employed an organic salt or an inorganic salt. Examples of the inorganic salt include the hydrochloride, sulfate, nitrate and the like, while said organic salt may be the formate, acetate, propionate, aspartate and glutamate, etc.

The metal catalyst to be employed in the reaction, may be one which is generally used for catalytic reduction. For example, platinum, palladium, nickel or other catalysts possessing varied degrees of activity which catalysts can be used either as such or in the form supported by carriers. As for the amount of said catalyst, it is sufficient that the catalyst be present in amount from 1 to 10 percent based on the weight of Enduracidin. While the reaction pressure may be atmospheric, the reaction time is reduced when the reaction is conducted at an elevated pressure of the order of 20 kg/cm². The reaction time ranges from 8 to 10 hours at atmospheric pressure and 4 to 8 hours at the elevated pressure. The time when the hydrogen ceased to be adsorbed may be regarded as the end point of the reaction.

Enduracidin reduction product thus obtained, may be used for a medical purpose after proper purification or may be used for further reaction directly or after the separation of the product from the reaction mixture.

The thus-obtained reduction product of Enduracidin is subjected to further reaction with an organic sulfonic acid represented by the formula

$$X\cdot(CH_2)_n\cdot SO_3M$$

wherein $n$ is 1, 2 or 3, M is hydrogen or alkali metal, and X is hydroxyl or amino radical or a radical represented by the formula —$SO_3M$ wherein M is hydrogen or alkali metal.

The organic sulfonic acid may be any of the lower alkyl-sulfonic acids such as hydroxymethanesulfonic acid, hydroxyethanesulfonic acid (isethionic acid), hydroxypropanesulfonic acid, ethan disulfonic acid, aminoethanesulfonic acid, etc. or any of the metal salts (preferably alkali metal salts) of such acids. As the organic sulfonic acid, there may be employed such a reaction solution of aldehyde, for example, aliphatic aldehydes such as formaldehyde (paraformaldehyde included), acetaldehyde, butyladehyde, etc., and sulforous acid or its salts (alkali metal sulfites or hydrogen sulfites).

The reaction is preferably conducted in an aqueous solution of lower alcohol or acetone, e.g. in the presence of 50 percent aqueous methanol. In view of the fact that Enduracidin or the reduction product thereof contains not only one primary amino group (the δ–$NH_2$ residue of ornithine), which is capable of condensing with the alkali metal salt of hydroxymethanesulfonic acid but also two basic functional groups, the reaction is preferably effected using 1 to 3 moles of organic sulfonic acid, e.g. hydroxymethanesulfonic acid, for every mole of Enduracidin starting material.

Satisfactory results are still obtained, of course, even when the alkali metal hydroxymethanesulfonate is used in lesser amounts or in a slight excess.

After the reaction is completed, the organic solvent is distilled out and the residue is either lyophilized or concentrated by precipitation, e.g. by azeotropic distillation with n-butanol, followed by the addition of a solvent in which the reaction product is difficulty soluble, e.g. ethyl ether or acetone. In this manner, the desired end product can be prepared. The end product may also, of course, be obtained by reacting the starting compound with formaldehyde and sodium hydrogen sulfite, for instance, in place of said alkali metal hydroxymethanesulfonate. Similarly, the hydroxyethanesulfonate of Enduracidin or of the reduction product of Enduracidin can be prepared in the same manner with the use of an alkali metal salt of hydroxyethanesulfonic acid (isethionic acid) instead of the hydroxymethanesulfonates, and in such cases, various derivatives are obtained by the use of 1 to 3 moles of organic sulfonic acid.

The structure of thus obtained sulfonic acid derivatives are represented by the following formula:

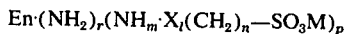

wherein $En(NH_2)_r NH_m$ is Enduracidin residue, $r$ is 0, 1 or 2, $p$ is 1, 2 or 3 and $r$ plus $p$ is 3, X is hydroxyl or amino radical or a radical of the formula: $-SO_3M$, wherein M is hydrogen or alkali metal, $n$ is 1, 2 or 3, $m$ is 1 or 2 and $l$ is 0 or 1, or when $n$ is 1, $m$ represents 1, $l$ represents 0 and X represents hydroxyl radical, and when $n$ is 2 or 3, $m$ represents 2 and $l$ represents 1.

The sulfonic acid derivatives of Enduracidin are useful as antibiotic agents and are generally administered in the form of powder, capsules, syrup, oil, injection, ointment, tablets, etc., i.e. orally, parenterally, topically or externally. Pharmaceutical compositions containing one or more of the products can be prepared according to any per se conventional means for the preparation of capsules, syrups, oils, injections, etc.

In the aforesaid various administrational forms, the active ingredient may be present in a minor proportion with the carrier constituting the major proportion. However, the reverse relationship may also be possible, so that a minor proportion of carrier is employed in association with a major proportion of active ingredient. Examples of administrational compositions are hereinafter exemplified.

| Ointment | |
|---|---|
| Hydroxymethane sulfonic acid derivatives of Enduracidin reduction product | 1 g. (grams) |
| Methyl para-hydroxybenzoate | 0.12 g. |
| Propyl para-hydroxybenzoate | 0.03 g. |
| Anhydrous lanoline | 9.85 g. |
| White petrolatum | 89 g. |

The ointment is used for the treatment of superficial cutaneous and mucosal infections.

| Solution | |
|---|---|
| Hydroxyethanesulfonic acid derivative of Enduracidin reduction product | 0.5 g. |
| Distilled water | to make 100 ml. (milliters) |

The solution is administered for the treatment of the suppurative middle ear atitis.

| Oils | |
|---|---|
| Hydroxyethanesulfonic acid derivative of Enduracidin reduction product | 0.5 g. |
| Cera alba | 4.8 g. |
| Peanut oil | to make 100 ml. |

| Injection | |
|---|---|
| Hydroxyethanesulfonic acid derivative of Enduracidin reduction product | 25 mg. (milligrams) |
| Polyoxyethylene ether of hydrogenated castor oil | 50 mg. |
| 1N-hydrochloride | 0.057 ml. |
| Sterilized distilled Water | to make 1 ml. |

| Tablets | |
|---|---|
| Hydroxyethanesulfonic acid derivative of Enduracidin reduction product | 0.1 g. |
| Lactose | 0.195 g. |
| Cornmeal | 0.1 g. |
| Magnesium stearate | 0.005 g. |
| total: | 0.4 g/Tablet |

The pharmaceutical compositions show a greater therapeutic activity against infections caused by *Streptococcus pyogenes*, *Staphylococcus aureus*, *Diplococcus pneumoniae*, etc. than that of hitherto known antibiotics.

A typical effective daily dose of the sulfonic acid derivative is usually about 0.02 to 20 mg/kg/day, desirably 0.1 to 0.5 mg/kg, for injection, although an increased or reduced daily dose is also effective depending on the severity of the infection being treated.

The following examples show presently preferred embodiments of this invention. It is to be understood that the following examples are solely for the purpose of illustration and not for limitation of this invention, and that variations may be resorted to without departing from the spirit of the invention. In the examples, weight parts bear the same relation to volume parts as do grams to milliliters.

EXAMPLE 1

1. 25 weight parts of Enduracidin hydrochloride is dissolved in 250 volume parts of 70 percent methanol, followed by the dissolution of 6 volume parts of acetic acid. 50 weight parts of 5 percent palladium-activated carbon (50 percent moisture) is added to the above solution so that the reduction takes place at an initial pressure of 20 kg/cm² of hydrogen gas and at room temperature, continuing until no more hydrogen gas is absorbed (3.5 hours). The catalyst is centrifugally discarded and the reaction mixture is subjected to the filtration using Toyo Roshi No. 5 C (Toyo Roshi Kaisha Ltd.) as a filter paper. The filtrate is concentrated to dryness under reduced pressure and washed with acetone. The product is then vacuum-dried in a desiccator, whereupon 19.4 weight parts of a colorless powdery reduction product in hydrochloride form is obtained.

Decomposition point 230°–233°C.
Elementary analysis:
C: 50.96
H: 6.29
N: 14.11
Cl: 4.38
Infrared absorption:
3.06, 3.45, 5.75(shoulder), 5.9(shoulder) 6.1, 6.45(shoulder), 6.6, 6.9, 7.2, 7.9–8.1, 8.5, 9.9, 11.9, 15–19 $\mu$.
Ultraviolet absorption $\lambda$ max 230 m$\mu$ ($\epsilon_{1cm}^{1\%}$ 200, in 90 percent methanol)

$\lambda$ max 275 m$\mu$ ($\epsilon_{1cm}^{1\%}$ 31.5, in 90 percent methanol)

2. In 40 volume parts of 50 percent aqueous methanol is dissolved 1.0 weight part of the above Enduracidin reduction product, followed by the addition of a solution of 0.06 weight part (1 mole) of sodium isethionate (sodium hydroxyethanesulfonate) in 2 volume parts of 50 percent aqueous methanol. The mixture is allowed to stand at room temperature overnight. Then, to the reaction solution is added n-butanol and the mixture is subjected to concentration under reduced pressure, followed by addition of ethyl ether to the concentrate, whereupon white precipitates are formed. The precipitates are collected by filtration and washed with ethyl ether, then dried in vacuo, whereby a hydroxy ethane-sulfonic acid derivative of Enduracidin reduction product is obtained.

The properties of the hydroxyethanesulfonic acid (1 mol) derivative of Enduracidin reduction product are as follows:

1. Decomposition point: 230°–242°C
2. Specific rotation: $[\alpha]_D^{22} = +72.8°$ (c = 1.0 in 70% MeOH)
3. Elementary analysis: C: 50.52 H: 5.78 N: 13.90 Cl: 4.03 S: 1.25
4. Rf values obtained in paper partition chromatography (method on "Whatman filter paper No. 1" (W. and R. Balston Ltd., Great Britain)):

| Solvents | Rf value |
|---|---|
| Acetic acid n-Butanol. Water(1:4:5) | 0.45 ± 0.1 |
| n-Butanol saturated with water | 0.0 |
| Pyridine. n-Butanol. Water(3:4:7) | 0.80 ± 0.1 |

5. Color Reactions:

| reagent | result |
| --- | --- |
| Ninhydrin reagent | positive (pale-brownish violet) |
| Barton's reagent (a mixture of equal volume of 1% aqueous ferric chloride and 1% aqueous potassium ferricyanate) | positive (pale-blue) |
| Dragendorff reagent | positive (orangish-yellow) |
| Alkaline potassium permanganate | discoloration occurs (reduction) |

6. Significant maximum-absorptions in ultraviolet spectrum:

$\lambda max = 230\ m\mu\ (\epsilon_{1cm}^{1\%}\ 200$ in 90 percent methanol)

$\lambda max = 267\ m\mu\ (\epsilon_{1cm}^{1\%}\ 32.6$ in 90 percent methanol)

7. Significant absorptions in infrared spectrum observed by the potassium bromide disk method:
   3.03 (strong)
   3.25 (shoulder)
   3.43 (strong)
   5.75 (shoulder)
   5.92 (shoulder)
   6.10 (strong)
   6.45 (shoulder)
   6.65 (strong)
   6.90 (middle)
   7.23 (middle)
   7.90 (shoulder)
   8.20 (middle)
   8.50 (shoulder)
   9.70 (middle)
   12.0 (weak)
   13.5 (weak)
   16-19.0 (broad)

8. Toxicity as determined with mice: $LD_{50} = 500–800$ mg/kg (intravenous injection)

9. Antibactreial spectrum as measured on TSA medium enriched with cattle blood:

| Test microorganism | Minimum inhibitory concentration(mcg/ml) | |
| --- | --- | --- |
| | Hydroxyethane-sulfonic Acid Derivative | Original |
| Staphylococcus aureus 209P | 0.78 | 0.78 |
| Streptococcus pyogenes E-14 | 0.78 | 0.78 |
| Streptococcus pyogenes Dick | 0.78 | 0.39 |
| Streptococcus pyogenes S-8 | 0.39 | 0.78 |
| Streptococcus pyogenes NY-5 | 0.78 | 0.78 |
| Streptococcus viridans SP | 0.78 | 0.78 |
| Diplococcus pneumoniae I | 0.78 | 0.78 |
| II | 0.39 | 0.78 |
| III | 0.39 | 0.78 |
| Corynebacterium diphtheriae | 0.78 | 0.78 |

10. The result of a therapeutic test in mice infected with Staphylococcus 308 A-1:

| Survival rate | surviving animals in heads / animals tested in heads | | | | |
| --- | --- | --- | --- | --- | --- |
| Dosage (mg/kg | 20 | 10 | 5 | 2.5 | $ED_{50}$ |
| Amount of inoculum $(LD_{50})^*$ | | | | | (mg/kg) |
| 5.6 | 5/5 | 5/5 | 5/5 | 0/5 | 3.8 |

*A multiple of $LD_{50}$

Thus, $ED_{50}$ of this product is 3.8 mg/kg when the amount of inoculation is 5.6 times as much as the median lethal dose ($LD_{50}$). $ED_{50}$ of Enduracidin reduction product under similar condition is 5.0 mg/kg.

EXAMPLE 2

1. 25 weight parts of Enduracidin hydrochloride is dissolved in 250 volume parts of 70 percent methanol, followed by addition of 6 volume parts of acetic acid. To the solution is added a platinum black, which is previously prepared from 0.5 weight part of platinum oxide, so that the reduction takes place at an initial pressure of 20 kg/cm² of hydrogen gas and at room temperature for 4 hours. Then, the catalyst is filtered off and the filtrate is concentrated to dryness under reduced pressure. The residue is washed with acetone and vacuum-dried in a desiccator. The above procedure yields 22.2 weight parts of a colorless powdery Enduracidin reduction product in hydrochloride form.

Decomposition point: 230°–233°C.
Elementary analysis:
C: 50.49
H: 5.96
N: 13.87
Cl: 4.21

2. To a solution of 1.0 weight part of Enduracidin reduction product in 40 volume parts of 50 percent aqueous methanol is added a solution of 0.06 weight part of sodium hydroxymethanesulfonate monohydrate (·1 mole) in 2 volume parts of 50 percent aqueous methanol, and the resulting mixture is treated in the same manner as example 1(2). The procedure yields the methanesulfonic acid derivative of Enduracidin reduction product. A toxicity test in mice: $LD_{50} > 500$ mg/kg (intravenous injection).

The result of a therapeutic test in mice infected with Staphylococcus aureus 208A-1 shows $ED_{50}$ (ratio) = 0.50 when compared with $ED_{50}$ value of Enduracidin.

Infrared absorption:
3.05, 3.45, 5.75(shoulder), 5.93(shoulder), 6.1, 6.45(shoulder), 6.6, 6.8–6.9, 7.3, 7.9–8.2, 8.5, 9.7, 12.0, 13.5, 16–19 $\mu$.

Ultraviolet absorption:

$\lambda\ max\ 230\ m\mu\ (\epsilon_{1cm}^{1\%}\ 195$, in 90 percent methanol)

$\lambda\ max\ 277\ m\mu\ (\epsilon_{1cm}^{1\%}\ 30.2$, in 90 percent methanol)

Concentrations of antibiotics ($\gamma$/ml. in plasma) in the blood on intramuscular injection into rats (6.25 mg/kg.).

| Time, in hours after injection | 2 | 4 | 8 | 12 | 24 |
| --- | --- | --- | --- | --- | --- |
| Antibiotics | | | | | |
| Enduracidin | — | 3.5 | 5.6 | 7.0 | 6.5 |
| Enduracidin reduction product | — | 6.3 | 8.6 | 8.5 | 5.5 |
| Methanesulfonate (1 mole) of Enduracidin reduction product | 8.1 | 10.7 | 12.8 | 11.0 | 7.7 |
| Methanesulfonate (3 moles) of Enduracidin reduction product | 6.9 | 9.1 | 11.1 | 11.3 | 6.8 |
| Hydroxyethanesulfonate (1 mole) of Enduracidin reduction product | 8.7 | 10.7 | 14.4 | 15.1 | 9.5 |

Concentrations of antibiotics ($\gamma$/ml. in plasma) in blood on intramuscular injection into rabbits (8 mg/kg).

| Hours after injection | 1 | 3 | 6 | 24 |
| --- | --- | --- | --- | --- |
| Antibiotics | | | | |
| Enduracidin | 2.75 | 3.20 | 4.30 | 2.45 |
| Enduracidin reduction product | 6.27 | 7.51 | 6.81 | 5.38 |
| Methanesulfonate (1 mole of Enduracidin reduction product | 7.53 | 9.00 | 9.07 | 6.00 |
| Methanesulfonate (3 moles) of Enduracidin reduction product | 7.13 | 10.47 | 9.70 | 5.80 |
| Hydroxyethanesulfonate (1 mole) of Enduracidin reduction product | 9.00 | 15.7 | 13.8 | 5.38 |

EXAMPLE 3

To a solution of 1.0 weight part of Enduracidin reduction product in 20 volume parts of 50 percent aqueous methanol is added a solution of 0.071 weight part (1 mole) of potassium-3-hydroxy-1-propanesulfonate in 2 volume parts of 50 percent aqueous methanol, and the resulting mixture is treated in the same manner as example 1 (2). The procedure yields the hydroxypropanesulfonic acid derivative of Enduracidin reduction product.

A toxicity test in mice: $LD_{50}$ >500 mg/kg. (intravenous injection).

Infrared absorption:
2.95–3.04, 3.43, 5.75(shoulder), 5.95, 6.1, 6.45(shoulder), 6.7, 6.9, 7.2, 7.9(shoulder), 8.2, 8.5, 9.6, 11.9, 14.5–19 $\mu$.

EXAMPLE 4

To a solution of 1.0 weight part of Enduracidin reduction product in 20 volume parts of 50 percent aqueous methanol is added a solution of 0.05 weight part (1 mole) of aminoethanesulfonate in 4 volume parts of 50 percent aqueous methanol, and the resulting mixture is treated in the same manner as example 1 (2). The procedure yields the aminoethanesulfonic acid derivative of Enduracidin reduction product.

A toxicity test on mice shows $LD_{50}$ > 500 mg/kg. (intravenous injection).

A therapeutic test on mice infected with *Staphylococcus aureus* 308A-1 results $ED_{50}$ (ratio)=0.40, when compared with Enduracidin (control).

Infrared absorption:
3.05, 3.45, 5.76(shoulder), 5.9(shoulder), 6.1, 6.45(shoulder), 6.6, 6.9, 7.2, 7.9(shoulder), 8.1, 8.5, 9.1, 9.6, 11.9, 13.5, 16–19 $\mu$.

EXAMPLE 5

To a solution of 1.0 weight part of Enduracidin reduction product in 20 volume parts of 50 percent aqueous methanol is added a solution of 0.047 weight part (1 mole) of disodium ethanedisulfonate in 4 volume parts of 50 percent aqueous methanol, and the resulting mixture is treated in the same manner as example 1 (2). The procedure yields the ethanedisulfonic acid derivative of Enduracidin reduction product.

A toxicity test on mice: $LD_{50}$= 250–500 mg/kg (intravenous injection).

The result of a therapeutic test on mice infected with *Staphylococcus aureus* 308A-1 shows $ED_{50}$(ratio) = 0.51, when compared with Enduracidin (control).

Infrared absorption:
2.95–3.05, 3.45, 5.75(shoulder), 5.9(shoulder), 6.1, 6.45(shoulder), 616, 619, 712, 719(shoulder), 8.1, 8.5, 9.7, 11.9, 15–19 $\mu$.

EXAMPLE 6

To a solution of 1.0 weight part of Enduracidin in 40 volume parts of 70 percent aqueous methanol is added a solution of 0.042 weight part of sodium hydrogen sulfite in 2 volume parts of water. Then, 0.033 weight part of a 37 percent aqueous solution of formaldehyde is added, and the mixture is allowed to stand at room temperature for 5 hours. After the methanol is distilled out from the reaction mixture, the residue is lyophilized, whereupon a methansulfonic acid derivative of Enduracidin (molar ratio 1:1) is obtained.

The molar ratio can be altered as desired by changing the weight proportion of sodium hydrogen sulfite and of formaldehyde.

Infrared absorption:
2.95, 3.43, 5.70(shoulder), 5.9(shoulder), 6.1, 6.45(shoulder), 6.6, 6.9, 7.2, 7.8–8.1, 8.5, 9.2, 11.9, 16–19 $\mu$.

EXAMPLE 7

To a solution of 1.0 weight part of Enduracidin in 40 volume parts of 50 percent aqueous methanol is added a solution of 0.18 weight part (3 moles) of sodium hydroxymethanesulfonate (the molar ratio of 1:3, relative to Enduracidin, products with molar ratios 1:1 and 1:2 can be obtained by altering the weight proportions of sodium hydroxymethanesulfonate) in 2 volume parts of 50 percent aqueous methanol. The mixture is allowed to stand at room temperature overnight. To the reaction mixture is added n-butanol and the resulting mixture is then concentrated under reduced pressure. Ethyl ether is added to the concentrate, whereupon white precipitates are obtained. The precipitates are collected by filtration and washed with ethyl ether, then dried in vacuo.

The procedure yields the hydroxymethanesulfonic acid derivative of Enduracidin reduction product.

Infrared absorption:
3.06, 3.44, 5.75(shoulder), 5.9(shoulder), 6.1, 6.45(shoulder), 6.6, 6.9, 7.2, 7.9(shoulder), 8.1, 8.5, 9.7, 11.9, 15–19 $\mu$.

The infrared absorption spectrum of this product shows not only the adsorption characteristics of Enduracidin but also the absorption characteristics of methanesulfonic acid derivatives at about 8.2 $\mu$ and 9.7 $\mu$ (KBr).

Ultraviolet absorption:
$\lambda$ max 230 m$\mu$ ($\epsilon_{1cm}^{1\%}$ 190, in 90 percent methanol)
$\lambda$ max 276 m$\mu$ ($\epsilon_{1cm}^{1\%}$ 31.5, in 90 percent methanol)

What is claimed is:

1. the hydroxyethane sulfonic acid derivative of the Enduracidin reduction product said product having a decomposition point of 230°–242°C, a specific rotation of:

$[\alpha]_D^{22} = +72.8°$ ($c = 1.0$ in 70% MeOH)

an infrared absorption spectra of:
3.03 (strong)
3.25 (shoulder)
3.43 (strong)
5.75 (shoulder)
5.92 (shoulder)
6.10 (strong)
6.45 (shoulder)
6.65 (strong)
6.90 (middle)
7.23 (middle)
7.90 (shoulder)
8.20 (middle)
8.50 (shoulder)
9.70 (middle)
12.0 (weak)
13.5 (weak)
16–19.0 (broad)

with a toxicity in mice via intravenous injection of $LD_{50}$ 500–800 mg./kg.

and an elementary analysis of:
C: 50.52
H: 5.78
N: 13.90
Cl: 4.03
S: 1.25

* * * * *